July 12, 1966  E. HENRY-BIABAUD  3,260,543
BALL-AND-SOCKET JOINT
Filed May 14, 1963

United States Patent Office 3,260,543
Patented July 12, 1966

3,260,543
BALL-AND-SOCKET JOINT
Edmond Henry-Biabaud, Paris, France, assignor to Société anonyme Andre Citroen, Paris, France, a French society organized under the laws of France
Filed May 14, 1963, Ser. No. 280,217
Claims priority, application France, May 14, 1962, 897,409
5 Claims. (Cl. 287—87)

The present invention relates to ball-and-socket joints comprising a ball held between two half-seatings, and more particularly to those in which the direction of the effort which is to be exerted on the ball is perpendicular to the plane of oscillation of the said ball.

It is an object of the invention to provide improvements in such joints.

According to the invention, the two half-seatings taper externally and are arranged in a tapering recess in an articulation member by which they are held by means of a locking part in the said recess against an elastic pressure member. The elastic pressure member is preferably constituted by a disc or washer made of elastic material.

Particularly in the case in which the direction of the force which is exerted on the ball in operation is perpendicular to the plane of oscillation of the ball, the recess of each half-seating in which the ball is located may be ogival so that the points of the ball and on the half-seating which are in contact substantially form a circle located in an oblique, but relatively only slightly inclined plane with respect to the plane of oscillation of the ball. This arrangement enables the line of contact to move through a larger or smaller zone of the surface of the ball and thus to ensure that the latter is well greased.

Figure 1:
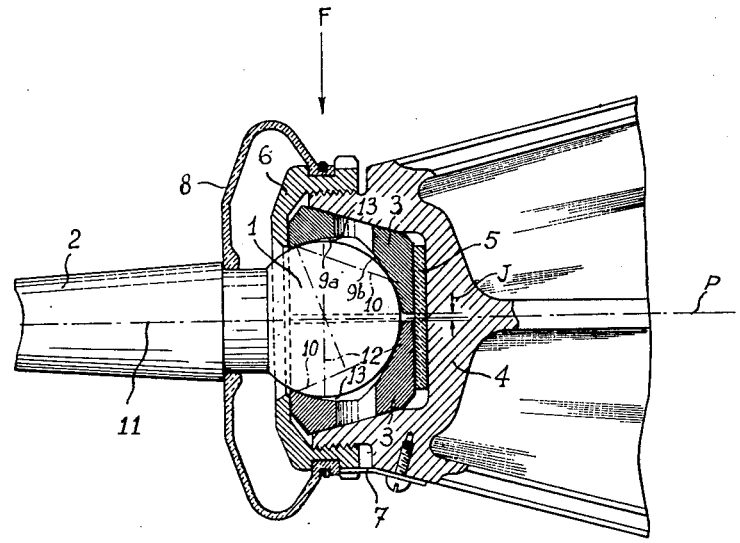
Figure 2:
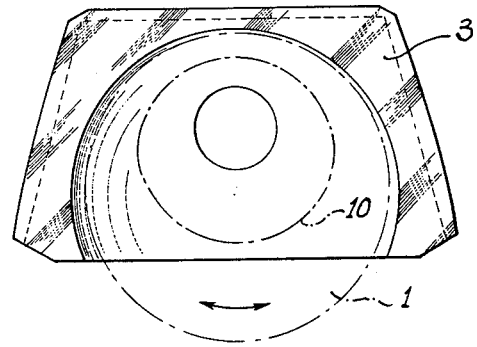

In order that the invention may be more clearly understood, reference will now be made to the accompanying drawings which show one embodiment thereof, by way of nonlimiting example, and in which:

FIGURE 1 shows a section of a joint according to the invention, taken in a plane passing through the axis of the ball and the direction of the effort, and FIGURE 2 shows an elevation of one of the half-seatings, the plane of the figure being the plane of oscillation of the ball.

As shown in the drawings, the joint, which is intended to be mounted at the lower end of a suspension arm, for example, comprises a ball 1 formed in the end of a shank 2, and located between two half-seatings 3. The external profile of the two half-seatings is that of a cone with a suffcient apex angle to avoid binding and they are located in a tapering recess in an articulation member 4, the conicity of this recess being the same as that of the profile of the half-seatings.

The half-seatings have a mean play $j$ between them and are held against a disc or washer 5 made of elastic material by a cap-nut 6 which is fixed by a stop 7. The assembly is covered by a sealing sleeve 8.

The recess in each half-seating 3 is not spherical but ogival and comprises two portions 9a and 9b having a radius larger than that of the ball 1. Thus the ball is in contact with the half-seating only around a circle 10 of which the plane is oblique but relatively only slightly inclined with respect to the plane of oscillation of the ball, the said plane being substantially perpendicular to the direction of the force F during operation. In practice, contact occurs around a spheroid ring of which the circle 10 is the mean line and which is wider or narrower depending on the difference between the radii 9a–9b and the radius of the ball, and on the tightness of the nut 6.

The joint is assembled as follows: the ball is capped by the half-seatings, which make contact with it along the circles 10; they are automatically placed in the correct position in the recess in the member 4 when the plane and the ball rotation couple are adjusted by means of the nut 6. In order to allow for manufacturing tolerances, it may be as well to impart a very slight curvature to the generatrices of the conical surfaces so as to allow for the truing up of the parts.

In operation, the ball shank 2 moves chiefly in the plane P passing through the axis 11 and perpendicular to the plane of FIGURE 1; in this movement, the said shank pivots about the axis 12; by virtue of the ogival shape of the recess of the half-seatings, there are spaces 13 at right angles to the axis 12, at the points where the pressure would normally be maximum and where the relative movements between the half-seatings are nil and may oppose the formation and the conservation of the lubricant film; all risk of binding is thereby eliminated.

All that is necessary in order subsequently to adjust the oscillation couple is to undo the stop 7, turn the nut 6 to the grip giving the desired couple and then, finally, to re-set the stop.

It will be apparent that the invention has been described only by way of example and that various modifications may be made to the specific details referred to, without in any way departing from its scope. For example, where the seatings or half-seatings 3 are made of plastics material, there is no need to impart an ogival shape to the recesses. In this case their walls conform to the shape of the ball 1 under the effect of the forces exerted on them; such forces may be exerted in any direction in relation to the ball since the deformation of the plastics material distributes them, eliminating the risk of local binding.

What I claim is:

1. A ball-and-socket joint comprising a spherical ball, an articulation member having a recess of truncated cone-shaped configuration which is open at its relatively large diameter end, two complementary bearing members received in said recess and having a plane of separation therebetween which is diametrical with respect to said recess, said bearing members having external surfaces complementary to said truncated cone-shaped configuration of the recess so as to be urged toward each other at said plane of separation in response to movement of said bearing members into said recess through said open end of the latter, said bearing members each having an internal ogival surface, said internal surfaces of the bearing members being generated by the revolution of ogival lines about axes which extend at substantial angles to said plane of separation at opposite sides thereof and are located in a plane substantially perpendicular to said plane of separation, said internal surfaces of the bearing members defining a socket receiving said spherical ball and respectively having seating contact with said ball along generally opposed circular regions of the latter, and adjustable locking means carried by said articulation member and engaging said bearing members to urge the latter into said recess and thus into seating contact with said ball in said socket.

2. A ball-and-socket joint according to claim 1; wherein said axes of the internal surfaces of revolution of said bearing members are inclined relative to perpendiculars to said plane of separation to cause said circular regions of contact of said spherical ball with said internal surfaces to be disposed in planes which converge toward said plane of separation in the direction into said recess.

3. A ball-and-socket joint according to claim 1; further comprising elastic means interposed between the relatively small-diameter end of said recess and said bearing members to yieldably resist movement of the latter into said recess beyond predetermined positions.

4. A ball-and-socket joint according to claim 3; wherein said elastic means consists of a washer of elastic material.

5. A ball-and-socket joint according to claim 1; wherein each of said bearing members has an orifice opening at said internal surface thereof in the region of the apex of said ogival line which generates said internal surface.

References Cited by the Examiner
UNITED STATES PATENTS

| 553,265 | 1/1896 | Scholer | 287—87 |
| 1,918,394 | 7/1933 | Hufferd | 287—90 |
| 1,934,223 | 11/1933 | Booth | 287—87 X |

CARL W. TOMLIN, *Primary Examiner.*

A. V. KUNDRAT, *Assistant Examiner.*